Patented Nov. 30, 1926.

1,609,038

UNITED STATES PATENT OFFICE.

WILLIAM EARL OLBERG, OF LONG BEACH, CALIFORNIA, ASSIGNOR TO CALIFORNIA CYANIDE COMPANY, INCORPORATED, OF NEW YORK, N. Y., A CORPORATION OF DELAWARE.

PROCESS OF PREPARING MAGNESIUM CYANIDE AND PRODUCT THEREOF.

No Drawing. Application filed May 22, 1926. Serial No. 111,033.

This invention relates to compounds of magnesium and cyanogen, and to a process for producing these compounds.

Commercially pure magnesium cyanide, in solid form, has not been described heretofore. It is stated in the literature that solutions of magnesium cyanide can be prepared but these solutions are decomposed by boiling (see "The chemistry of cyanide compounds," by Herbert E. Williams, page 59). It is not practicable, therefore, to produce magnesium cyanide in solid form by evaporation of solutions containing this salt.

It is the object of the present invention to provide a process of producing magnesium cyanide in a commercially pure and solid form whereby this compound can be made available for the various uses to which it is adapted.

Other objects and advantages of the invention will be apparent as it is better understood by reference to the following specification in which the preferred procedure and the products obtained are described.

The product which I have prepared is magnesium cyanide containing combined ammonia and has generally the formula $Mg(CN)_2.2NH_3$. Some variation of the ammonia and cyanogen content has been observed and the formula may, therefore, be $Mg(CN)_2.xNH_3$ with or without additional cyanogen combined or otherwise held in the compound. The preferred product which is quite stable except when exposed to the atmosphere has, according to my analyses, two molecules of ammonia.

The process by which I obtained magnesium cyanogen compounds, containing ammonia of combination, consists in bringing together an appropriate magnesium compound, ammonia and hydrocyanic acid. I have discovered that cyanogen compounds of magnesium may be satisfactorily obtained under widely varying conditions. That is to say, the details of the process may be widely varied to produce the desired compound. This will be made clear in the following description of the process.

Any one of various water-soluble magnesium salts may be dissolved in water and an amount of ammonium hydroxide, at least sufficient to react with the magnesium compound in solution to form magnesium hydroxide and the ammonium salt of the acid radical with which the magnesium was originally obtained, may be added to the solution. Since ammonia of combination appears in the finished product, an excess of ammonia over and above that necessary to react, as described above, with all of the magnesium salt present, should be added in order that sufficient free ammonia may remain to furnish the ammonia of combination in the final product. Hydrocyanic acid may be added then to the solution. It is desirable to add a very considerable excess of hydrocyanic acid, since the magnesium compound formed is less soluble in hydrocyanic acid than it is in water or an aqueous solution of ammonia. The excess of hydrocyanic acid tends to produce more complete precipitation of the magnesium compound. In fact, I have found that in some cases no precipitation at all may occur unless an excess of hydrocyanic acid is used.

It is desirable to provide a nearly saturated solution of the magnesium salt because a certain amount of final compound will remain dissolved in the mother liquor, and the use of a saturated solution permits the best yields. Furthermore, I have found that if too dilute a solution is used, a certain amount of water may appear in the final product. I am not certain whether this water is held mechanically, or whether it is water of crystallization. The water is apt, however, to reduce the stability of the finished product. It also necessarily reduces the cyanogen content of the product and hence is undesirable.

In carrying out my process, I have not found it necessary to control the temperature of the reaction mixture at any point of the process up to the final operation of drying the product, which operation will be described later. As is already well known, many magnesium salts dissolve in water with absorption of heat. I have also observed a further absorption of heat on the addition of ammonia to the solution of the magnesium salt, and a further absorption of heat, indicated by a decrease in temperature of the reaction mixture, upon adding hydrocyanic acid. I am not certain whether this final reduction of temperature is partially due to an endothermic reaction or whether it is wholly due to the dilution of hydrocyanic acid. It is already known that the mixing of hydrocyanic acid with water is accompanied by a considerable absorption of heat. In case the operation is carried out in open vessels, a further reduction in temperature may be caused by the evaporation of a part of the hydrocyanic acid used.

In general it appears that any magnesium salt may be used which has a reasonable degree of solubility in water, or more especially, in the solution which results after the completion of the reaction. In the case of certain salts, for example, magnesium sulphate, I have found that the final product contains magnesium sulphate in addition to the magnesium cyanogen ammonia compound. I believe this to be due to the fact that magnesium sulphate is not very soluble in the final solution, and therefore a certain amount of magnesium sulphate is precipitated along with the desired compound. The final solution, in this case, might be expected to consist of an aqueous solution of ammonium sulphate, ammonium cyanide and hydrocyanic acid, provided more than enough hydrocyanic acid was used to react with all of the ammonia present.

After precipitation, the product is filtered by means of suction, and washed with hydrocyanic acid to remove the reaction solution adhering to it. It may be dried by any convenient means. For example, it may be dried under 20'' of vacuum at 40° C. until all of the excess HCN from the washing has been removed. In carrying out the process, I discovered that the drying period will influence the composition of the final product; for instance, in runs which were dried for short periods of time, the material contained a great deal more cyanogen than was possible for a compound whose formula was $$Mg(CN)_2.2NH_3.$$

It was found that the shorter the drying period, the higher the cyanogen content, although, to all appearances, the product had become entirely dry. For example, a batch dried at 40° C. for twenty minutes showed 57.1 cyanogen content; another dried at fifteen minutes contained 58.1 cyanogen, while one batch dried for only ten minutes, analyzed 62.3 cyanogen. The apparently high cyanogen content of these runs must have been caused by excess HCN held either mechanically, or in combination, with some of the ammonia. Subsequent batches dried in this manner and showing such an excess of cyanogen, when again dried, lost this excess until they conformed to the formula $Mg(CN)_2.2NH_3$. Thirty minutes of drying removed the excess cyanogen satisfactorily and longer periods up to and including one and one half hours failed to remove an appreciable additional amount of hydrocyanic acid as long as the temperature did not rise over 40° C. Batches containing more or less of this excess cyanogen are white when made, but slowly turn to a light brown upon standing, although kept in a tightly stoppered container. Portions which were exposed to the atmosphere remained white, even after seven days.

I have also discovered that a water solution of the magnesium salt employed in the production of this compound is not necessary in order to cause reaction to take place. I have discovered that a suitable magnesium salt placed in a container with hydrocyanic acid will react to form this magnesium cyanogen compound upon the addition of a suitable amount of ammonium hydroxide. For example, to the dry magnesium salt, I added hydrocyanic acid in considerable excess over that required to form the resulting compound, and I then added enough ammonium hydroxide to this mixture to cause a reaction between the hydrocyanic acid and the magnesium salt, and to furnish enough ammonia to be combined as $Mg(CN)_2.2NH_3$. I have reason to believe that the magnesium salts employed in this adaptation of the process are slightly soluble in hydrocyanic acid, as the first addition of ammonium hydroxide to the reaction mixture results in a partial precipitation of the compound. After precipitation, the procedure of filtering and drying is the same as has been described above, and the material exhibits the same properties as that made by the other process.

The following examples will serve to illustrate further the nature of my invention:

*Example No. 1.*

I dissolved 5 grams of magnesium nitrate in 3 cc. of water, and to this solution I added 15 cc. of HCN, then 10 cc. of ammonium hydroxide, and finally 40 cc. of hydrocyanic acid, which caused the magnesium cyanide to precipitate. The precipitate was filtered by means of suction, washed with hydrocyanic acid, and dried in a vacuum at 40° C. for thirty minutes. The yield was 2.107 grams, and the material analyzed as follows:

| | Per cent. |
|---|---|
| Mg | 23.0 |
| CN | 47.1 |
| NH₃ | 27.2 |

*Example No. 2.*

To 5 grams of magnesium nitrate in a beaker, I added 40 cc. of hydrocyanic acid, and to this mixture 15 cc. of ammonium hydroxide with vigorous stirring. The magnesium nitrate dissolved at a fairly rapid rate and an immediate precipitation of magnesium cyanide occurred. When all of the magnesium nitrate had been dissolved, the mixture was filtered by means of suction, washed with 30 cc. of hydrocyanic acid and dried in a vacuum at 40° C. for forty minutes. The average yield of several runs was 2.006 grams and the analyses as follows:

|  | Per cent. |
|---|---|
| Mg | 21.8 |
| CN | 46.3 |
| $NH_3$ | 28.9 |

*Example No. 3.*

A larger amount of a different magnesium salt, with corresponding larger amounts of reagents, is illustrated in the following example. I placed 15 grams of magnesium chloride in a suitable container and added 100 cc. of hydrocyanic acid. I then slowly added 50 cc. of ammonium hydroxide, constantly stirring the mixture until all of the magnesium chloride had been dissolved and precipitation of magnesium cyanide completed. From this point the procedure was similar to that given in the previous examples. The average yield of several runs was 6.874 grams and analyzed as follows:

|  | Found | Calculated for $Mg(CN)_2.2NH_3$ |
|---|---|---|
|  | Per cent | Per cent |
| Mg | 22.2 | 22.0 |
| CN | 47.0 | 47.1 |
| $NH_3$ | 30.0 | 30.9 |

The compound $Mg(CN)_2.2NH_3$, when dry, is white, or a faint pink, buff or brownish color. It is distinctly crystalline and becomes very light and fluffy when dried. It is soluble in water and methyl alcohol and burns readily with a pronounced odor of ammonia. When exposed to the atmosphere it evolves hydrocyanic acid and ammonia.

The product as described is adapted for various uses, including fumigation and the sweetening of electrolytic baths. For fumigation the product is exposed to the atmosphere. The decomposition which results releases hydrocyanic acid rapidly and in copious volume.

Various changes may be made in the details of the operation and the composition of the product may vary as hereinbefore indicated without departing from the invention or sacrificing any of the advantages thereof.

I claim:—

1. The product consisting of dry, solid magnesium cyanide with combined ammonia.

2. The product consisting of dry, solid magnesium cyanide with combined ammonia and an excess of cyanogen.

3. The product consisting of dry, solid magnesium cyanide having the formula $Mg(CN)_2.xNH_3$.

4. The product consisting of dry, solid magnesium cyanide having the formula $Mg(CN)_2.2NH_3$.

5. The process of producing magnesium cyanide, which comprises combining hydrocyanic acid with a magnesium salt in the presence of ammonium hydroxide and separating the precipitate.

6. The process of producing magnesium cyanide, which comprises combining hydrocyanic acid with a magnesium salt in the presence of an excess of ammonium hydroxide and separating the precipitate.

7. The process of producing magnesium cyanide, which comprises combining an excess of hydrocyanic acid with a magnesium salt in the presence of ammonium hydroxide and separating the precipitate.

8. The process of producing magnesium cyanide, which comprises dissolving a magnesium salt in a mixture of hydrocyanic acid and ammonium hydroxide and separating the precipitate.

9. The process of producing magnesium cyanide, which comprises combining hydrocyanic acid with a magnesium salt in the presence of ammonium hydroxide, separating the precipitate and drying it under vacuum at a temperature not exceeding 40° C.

In testimony whereof I affix my signature.

W. EARL OLBERG.